United States Patent
Wentzlaff et al.

Patent Number: 5,560,061
Date of Patent: Oct. 1, 1996

[54] WASHING MACHINE WITH A REVERSING-MODE WASHING DRUM

[75] Inventors: Günter Wentzlaff; Ingo Schulze, both of Berlin; Harald Moschütz, Grossbeeren; Gundula Czyzewski, Berlin, all of Germany

[73] Assignee: Bosch-Siemens Hausgeraete GmbH, Munich, Germany

[21] Appl. No.: 220,978

[22] Filed: Mar. 31, 1994

[30] Foreign Application Priority Data

Mar. 31, 1993 [DE] Germany .................. 43 10 595.5

[51] Int. Cl.⁶ ............................................. D06F 33/02
[52] U.S. Cl. ............................ 8/159; 68/12.04; 68/12.12
[58] Field of Search ............... 8/158, 159; 68/12.01, 68/12.04, 12.12, 58

[56] References Cited

U.S. PATENT DOCUMENTS

| | | | |
|---|---|---|---|
| 4,741,182 | 5/1988 | Didier et al. | 68/12.01 |
| 4,794,661 | 1/1989 | Durazzani | 8/159 X |
| 5,207,764 | 5/1993 | Akabane et al. | 68/58 X |
| 5,335,524 | 8/1994 | Sakane | 68/12.04 |

FOREIGN PATENT DOCUMENTS

| | | | |
|---|---|---|---|
| 0390943 | 10/1990 | European Pat. Off. | 68/12.01 |
| 0404047 | 12/1990 | European Pat. Off. | 68/12.12 |
| 0475462 | 3/1992 | European Pat. Off. | 68/12.01 |
| 3712118 | 11/1987 | Germany | 68/58 |
| 3933355 | 5/1990 | Germany | 68/12.01 |
| 9190 | 1/1992 | Japan | 68/12.01 |

*Primary Examiner*—Philip R. Coe
*Attorney, Agent, or Firm*—Herbert L. Lerner; Laurence A. Greenberg

[57] ABSTRACT

A washing machine includes a perforated washing drum with a contact rpm at which items of laundry in the washing drum come to rest against a surface of the washing drum due to centrifugal force. The washing drum is intermittently driven in alternating rotary directions (reversing mode) during washing and/or rinsing, for accelerating the washing drum in one of the rotary directions to a first rpm being markedly below the contact rpm and accelerating the washing drum in the other of the rotary directions to a second rpm being markedly above the contact rpm.

10 Claims, 2 Drawing Sheets

WASHING MACHINE WITH A REVERSING-MODE WASHING DRUM

BACKGROUND OF THE INVENTION

1. Field of the Invention

The invention is based on a washing machine with a perforated drum being intermittently driven in alternating rotary directions during washing and/or rinsing (so-called reversing mode).

Such a washing machine is known from German Published, Non-Prosecuted Disclosure DE 37 41 177 A. In that publication, the laundry is shifted in reversing fashion inside the drum during the washing and rinsing cycle at a typical drum rpm of 55 1/min, for instance. During the times when the drum is at a stop, the detergent solution seeps slowly through the laundry in the direction of gravity before the laundry is restratified in the next phase of operation. At the times when the drum is stopped, the level of the washing solution that is not contained in the laundry, which is largely reabsorbed by the laundry during the phases of operation of the drum, therefore rises in the washing solution container. The level of available washing solution therefore drops again during the phases of operation.

In order to make the flow of the washing solution through the laundry more intensive, so-called wash-spin phases are incorporated in the known washing machine, during which the drum is accelerated from a standstill to an rpm of approximately 300 1/min so that a large proportion of the detergent can be largely spun out. The level of available detergent in the washing solution container then rises even further.

Due to the acceleration of the drum beyond the resonant rpm, which may be at about 120 1/min, the swingingly suspended washing solution container assembly is often extremely heavily loaded during the washing and rinsing cycle. This extreme load is due to the fact that the drum must always be accelerated from a state in which there is a high washing solution level with completely soaked laundry. The loads apply on one hand to the drive (motor, gears) and on the other hand, during the resonant transition, to the washing solution container assembly and its suspension. Due to the resultant extremely major deflections of the washing solution container assembly, a larger swing space must also be provided in the washing machine, so that this assembly will not strike parts of the housing during the resonant transition. On the other hand, if wash-spin phases are only occasionally activated, more-intensive expulsion of the washing solution from the laundry is necessary, at a higher rpm.

SUMMARY OF THE INVENTION

It is accordingly an object of the invention to provide a washing machine with a reversing mode washing drum, which overcomes the hereinafore-mentioned disadvantages of the heretofore-known devices of this general type and in which intense flooding of the laundry with washing solution still occurs. Moreover, an improvement in washing action in the laundry and a reduction in the use of water, washing agents and energy are also sought.

With the foregoing and other objects in view there is provided, in accordance with the invention, in a washing machine having washing and rinsing cycles, the improvement comprising a perforated washing drum having a contact rpm at which items of laundry in the washing drum come to rest against a surface of the washing drum due to centrifugal force; and means for intermittently driving the washing drum in alternating rotary directions (reversing mode) during washing and/or rinsing, the driving means accelerating the washing drum in one of the rotary directions to a first rpm being markedly below the contact rpm and accelerating the washing drum in the other of the rotary directions to a second rpm being markedly above the contact rpm.

As a result, in each reversing phase, which may last 25 seconds, for instance, in one rotary direction, the laundry is given an opportunity to swell up intensively and completely with washing solution, while in the other direction of rotation, by means of spinning, it can give up this portion of the washing solution again. Since this process occurs in each reversing cycle, that is every 25 seconds, for instance, the exchange of washing solution portions bound in the laundry at any time is more intensive than in the prior art. Nevertheless, with the provisions of the invention it is possible to overcome the disadvantages of the prior art, because the rpm required for spinning the detergent out can be kept considerably lower. The provisions of the invention reduce water consumption by artificially increasing the free washing fluid when spinning the detergent out of the laundry in the other direction of rotation and make the exchange of washing solution in the laundry more intensive, thereby achieving a markedly better washing action while economizing on washing agents. During the reversing cycles, the laundry distributes more uniformly in the drum, so that all parts of the laundry are evenly impacted upon by the washing solution exchange. This process also speeds up the rinsing action during the rinse cycle, and as a result the length of both the wash cycle and the rinse cycle can be shortened. Reducing the water consumption in the wash cycle also lowers the energy consumption for heating the water and with a shortening of the wash and spin cycles, shorter motor ON times occur. The contact rpm is the system-dictated rpm, at which the items of laundry present in the drum come to rest against the jacket of the drum by centrifugal force. In the case of washing machine drums having a diameter of approximately 470 mm, this speed is approximately 70 1/min.

In accordance with another feature of the invention, in a washing machine having carriers with scooping action, the scooping action is even better exploited if the washing machine of the invention is advantageously further developed in such a way that the first rpm is employed in that particular rotary direction and adjusted to that particular rpm value at which the scooping action is the greatest. This provision makes it possible to optimize the particular action of carriers provided with scooping devices by adaptation of the rpm and the direction of rotation.

In accordance with a further feature of the invention, the second rpm is markedly below the resonant rpm. This is especially advantageous because it makes it possible to reliably avoid having undesirably strong resonant vibrations overload the drive and the washing solution container assembly.

In accordance with an added feature of the invention, in order to ensure an even more gentle impact on the drive, the drum, at least in the other rotary direction, that is from the start up to the second rpm, is accelerated slowly to the rated rpm by means of a so-called soft start up circuit.

In accordance with an additional feature of the invention, in a washing machine equipped with scooping devices on the drum, a first rpm is approximately equal to 35 rpm, which has proven to be especially suitable.

In accordance with yet another feature of the invention, the rated value for the second rpm which is approximately 100 rpm, which has also proved to be especially suitable.

In accordance with a concomitant feature of the invention, there is provided a device for ascertaining the quantity of laundry placed in the drum, and the rated values of the rpm are adjustable as a function of the quantity of laundry. Since the load quantity of the drum has an influence on the best-suited rpm at a given time in the two directions of rotation of the drum, this provides an opportunity for even further optimization.

Other features which are considered as characteristic for the invention are set forth in the appended claims.

Although the invention is illustrated and described herein as embodied in a washing machine with a reversing mode washing drum, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
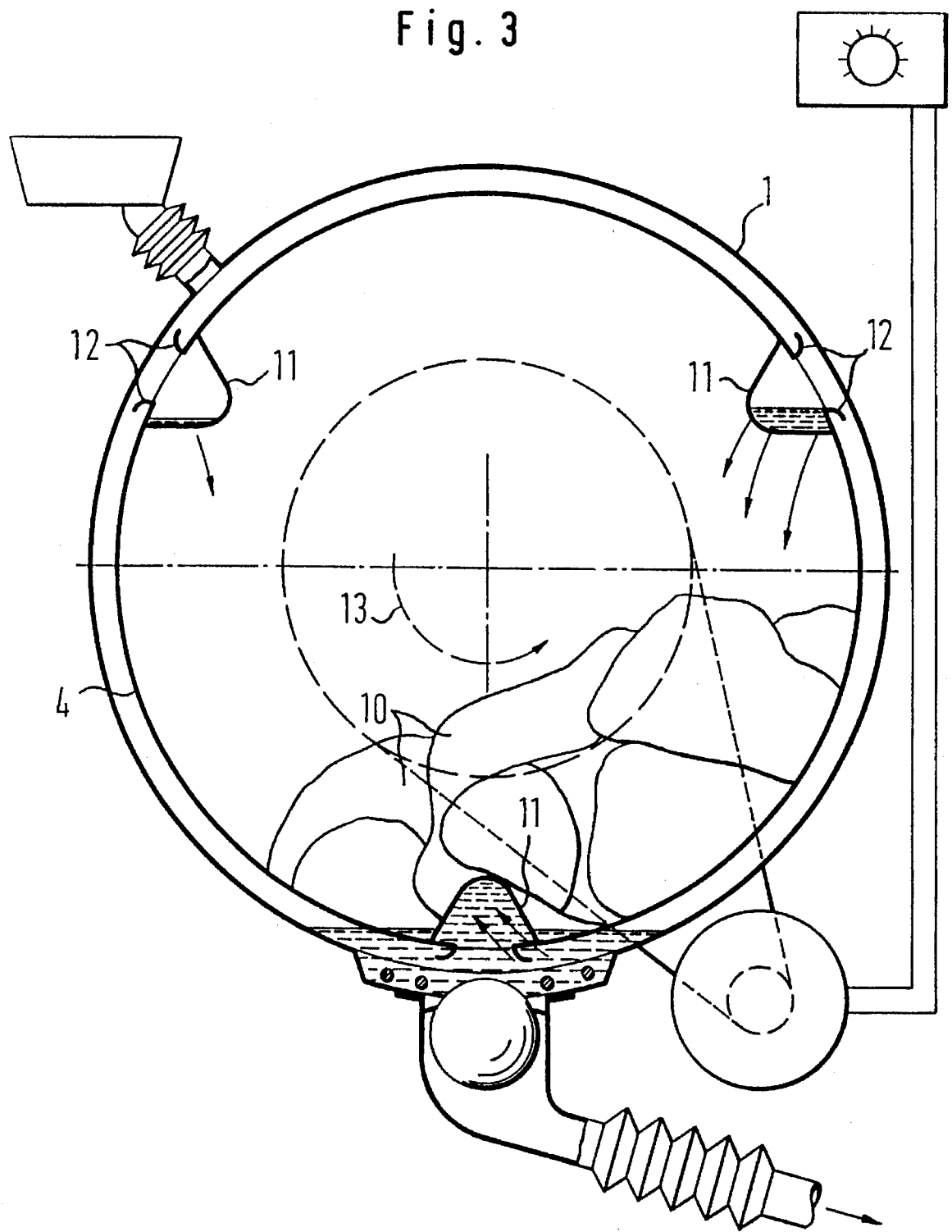
FIG. 3 is fragmentary, diagrammatic, partly sectional view of a washing machine.

Referring now to the figures of the drawing in detail and first, particularly, to FIG. 3 thereof, there is seen a washing solution container 1 of a washing machine which has a fill opening in an upper portion thereof for a washing agent or detergent being introduced from a washing agent dispenser shown at the upper left of FIG. 3, along with non-illustrated fresh water.

The washing solution container 1 has a bottom that is maintained in a position in which it is spaced as close as possible to a drum 4 and the bottom has a depression in which heaters that are required for heating the washing solution are disposed. An outlet opening is provided at a lowermost point of the depression and is kept closed by a spherical closure body due to its own buoyancy. A drive motor for the drum 4, which is shown at the lower right of FIG. 3, is controlled in both directions of rotation and is controlled for various rotary speeds by a control unit which is indicated at the upper right of FIG. 3 and has a soft start up circuit. The drive motor and the control unit together provide means for intermittently driving the drum.

With the increasing tendency to use less and less water and washing agent in the washing solution for washing, the quantity of water needed for washing has most recently dropped so far that the drum 4 dips only slightly into the washing solution located in the bottom of the washing solution container 1. However, that presents a previously unknown difficulty, which is that laundry 10 resting on the bottom of the drum 4 no longer comes into adequate contact with the washing solution, so that the laundry is only very slowly and very incompletely moistened. That threatens the results of washing.

Scooping devices 12 are therefore disposed on the periphery of the drum 4 in the vicinity of carriers 11. Upon rotation of the drum 4, for instance in the direction of an arrow 13, these devices 12 can fill temporary storage spaces provided in the carriers 11 with a supply of washing solution located in the depression. During an upward motion of a carrier 11, this scooped-up quantity of water is first temporarily stored and then is dispensed into the interior of the drum through outlet openings on the inside of the drum only after the temporary storage space has reached a certain height above the laundry 10 located in the drum 4. Arrows leading from the carriers 11 located at the top in FIG. 3 show how the water which is thus raised sprinkles over the laundry 10.

If the drum 4 in the washing machine is driven back and forth during a wash and/or spin segment or in other words in reversing fashion, the invention proposes configuring this reversing assymetrically, in such a way that the counter-clockwise and clockwise rotation of the drum have different influences in the washing cycle. One of the two directions of rotation causes an increase in the level of non-bound detergent in a washing solution container and better flooding of the laundry with the detergent, whereas the other direction of rotation provides better separation of the pieces of laundry from an inner wall surface of the drum and better distribution and moistening or sprinkling of the laundry. A lower rpm of 35 1/min, for instance, is employed in counter-clockwise rotation, at which rpm the scooping devices 12 in the drum 4 become operative, and a higher rpm of 100 1/min, for instance, is employed in clockwise rotation, in which the scooping action of such scooping devices 12 remains without effect. Advantageously, such scooping devices 12 that are provided on the carriers 11 of the drum 4 may, for instance, act assymetrically by definition, or in other words in the present example only in the counter-clockwise direction of rotation.

Figure 1:
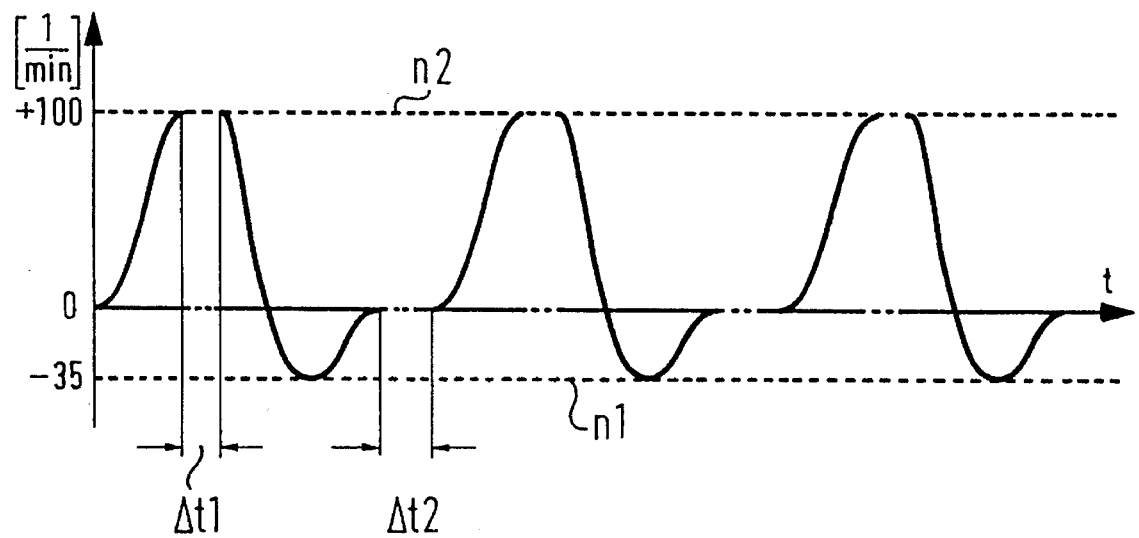
FIG. 1 is an rpm diagram for a reversing cycle provided in accordance with the invention.

In the example of FIG. 1, the drum is gently accelerated to 100 1/min in clockwise operation, it remains for some time at Δ t1, then it is returned to a zero rpm and then immediately changed to the counter-clockwise phase with an rpm of 35 1/min, for instance. The length of the time segments for clockwise and counter-clockwise rotation may be varied. After the counter-clockwise phase, the drum is returned to a standstill again and likewise remains at a standstill for a selectable period of time Δ t2. The lengths of time Δ t1 and Δ t2 are likewise variable, and in an extreme case they may be zero.

Figure 2:
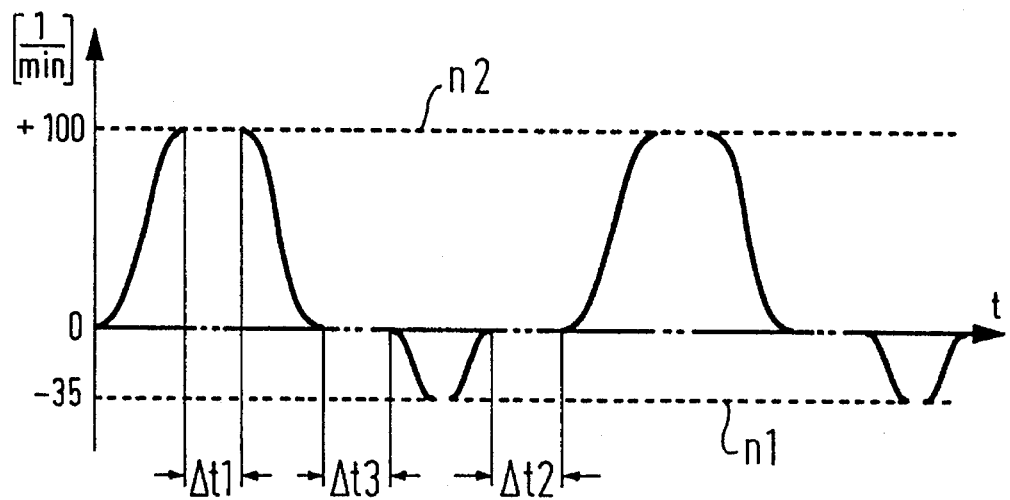
FIG. 2 is a further example of a reversing cycle, which is shown in terms of an rpm diagram.

In the example shown in FIG. 2, the counter-clockwise phase is also begun gently, resulting in a standstill phase between clockwise and counter-clockwise rotation that lasts a duration of Δ t3, which just like the respective durations Δ t1 and Δ t2 can be varied and may be zero in an extreme case.

Given rpm values n1 and n2 are freely selectable within the limits defined by the patent claims, and a deviation should be considered to be pronounced, if the mean value of a set rpm range deviates by at least 5 1/min from the mean value of the rpm limit value. In order to attain the optimum in terms of actions, fixed machine parameters must be taken into account, in particular in selecting the rpm. These parameters result from the dimensions of the drum, the perforation holes in it, the carriers, and the scooping devices.

Variable values, such as the load quantity of the drum, may advantageously also be taken into account and may affect the choice of rpm values, if the washing machine has a device for ascertaining the quantity of laundry placed in it. However, even without the influence of that parameter, an improvement in washing action and a reduction in the use of water, washing agent and energy can be achieved that already comes quite close to the optimum.

We claim:

1. In a washing machine having washing and rinsing cycles, the improvement comprising:

a perforated washing drum having a contact rpm at which items of laundry in said washing drum come to rest against a surface of said washing drum due to centrifugal force; and means for intermittently driving said washing drum in alternating rotary directions within a single reversing mode cycle, said driving means, during the single reversing mode cycle, accelerating said washing drum in one of said rotary directions only to a first rpm markedly below said contact rpm and accelerating said washing drum in the other of said rotary directions only to a second rpm markedly above said contact rpm.

2. The washing machine according to claim 1, including carriers in said washing drum having scooping devices performing a scooping action being greatest in a given one of said rotary directions and at a given rpm value, said first rpm being in said given rotary direction and adjusted to said given rpm value.

3. The washing machine according to claim 2, wherein said first rpm has a rated value being approximately equal to 35 rpm.

4. The washing machine according to claim 3, including a device for ascertaining a quantity of laundry placed in said washing drum, said rated value of said first rpm being adjustable as a function of the quantity of laundry.

5. The washing machine according to claim 1, wherein said second rpm is markedly below a resonant rpm.

6. The washing machine according to claim 5, wherein said second rpm has a rated value being approximately equal to 100 rpm.

7. The washing machine according to claim 6, including a device for ascertaining a quantity of laundry placed in said washing drum, said rated value of said second rpm being adjustable as a function of the quantity of laundry.

8. The washing machine according to claim 1, wherein said driving means has a soft start up circuit for slowly accelerating said washing drum to a rated rpm, at least in said other rotary direction.

9. The washing machine according to claim 8, including a device for ascertaining a quantity of laundry placed in said washing drum, said rated rpm being adjustable as a function of the quantity of laundry.

10. In a method of operating a washing machine with washing cycles and rinsing cycles in reversing mode, wherein the washing machine has a perforated washing drum with a contact rpm at which items of laundry in said washing drum come to rest against a surface of said washing drum due to centrifugal force;

the improvement which comprises:

intermittently driving the washing drum in alternating rotary directions within a single reversing mode cycle, by accelerating said washing drum in one of said rotary directions only to a first rpm markedly below said contact rpm, and accelerating said washing drum in the other of said rotary directions only to a second rpm markedly above said contact rpm.

* * * * *